(12) United States Patent
Siedow et al.

(10) Patent No.: US 6,275,382 B1
(45) Date of Patent: *Aug. 14, 2001

(54) APPARATUS FOR MOUNTING A PERIPHERAL DEVICE IN A COMPUTER SYSTEM

(75) Inventors: Roger A. Siedow; Jason A. Shepherd, both of Austin, TX (US)

(73) Assignee: Dell USA, L.P., Round Rock, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/291,434

(22) Filed: Apr. 13, 1999

(51) Int. Cl.⁷ .................................. G06F 1/16; H05K 7/18
(52) U.S. Cl. ............................................... 361/727; 361/730
(58) Field of Search ........................................ 361/683, 685, 361/686, 727, 730, 735, 741; 248/912; 312/223

(56) References Cited

U.S. PATENT DOCUMENTS

| | | |
|---|---|---|
| Re. 35,915 | 10/1998 | Hastings et al. . |
| 4,941,841 | 7/1990 | Darden et al. . |
| 5,136,446 | 8/1992 | Yamamoto et al. . |
| 5,155,662 | 10/1992 | I-shou . |
| 5,187,643 | 2/1993 | I-Shou . |
| 5,229,919 | 7/1993 | Chen . |
| 5,349,483 | 9/1994 | Tsai . |
| 5,355,267 | 10/1994 | Aoyagi et al. . |
| 5,564,804 * | 10/1996 | Gonzalez et al. ................. 312/223.2 |
| 5,587,879 | 12/1996 | Spano et al. . |
| 5,653,518 * | 8/1997 | Hardt ................ 312/334.4 |
| 5,654,870 * | 8/1997 | Havener ................ 361/600 |
| 5,683,159 * | 11/1997 | Johnson ............ 312/334.7 |
| 5,734,557 * | 3/1998 | McAnally et al. .................. 361/727 |
| 5,768,099 | 6/1998 | Radloff et al. . |
| 5,978,212 * | 11/1999 | Boulay et al. ....................... 361/685 |
| 5,995,364 * | 11/1999 | McAnally et al. ................... 361/685 |
| 6,025,987 * | 2/2000 | Allirot et al. ....................... 361/685 |

* cited by examiner

Primary Examiner—Lynn D. Feild
(74) Attorney, Agent, or Firm—Haynes and Boone, L.L.P.

(57) ABSTRACT

A peripheral device mounting system including a peripheral device having a pattern of threaded holes formed therein, a chassis configured to receive the peripheral device, a mounting bracket and a member for engaging an adjacent edge of a computer system chassis to secure the peripheral device relative to the chassis. The mounting bracket includes a main wall, spaced apart walls, and a protruding member attached to one of the spaced apart walls. The protruding member is configured engagement member.

11 Claims, 3 Drawing Sheets

US 6,275,382 B1

APPARATUS FOR MOUNTING A PERIPHERAL DEVICE IN A COMPUTER SYSTEM

BACKGROUND

The disclosures herein relate generally to computer systems and more particularly to an apparatus and method for mounting a peripheral device in a computer system.

Peripheral devices such as floppy disk drives (herinafter also referred to as FDDs) are typically mounted in a computer system using screws to affix them either directly to a chassis of the computer system or to a separate plate or bracket which is mounted to the chassis. The use of screws to mount a peripheral device takes more manufacturing assembly time than snap-in place mounting methods. During manufacturing of the computer system, this additional time reduces factory thru-put and increases facility requirements and assembly costs.

Various mounting configurations have been proposed that minimize labor and the number of screws required to secure the peripheral device in the chassis. Separate mounting devices are often used to transfer the screw attachment process to a more appropriate assembly location than in the chassis during the manufacture of the computer system. For example, some chassis manufacturers offer mounting clips that are attached to the FDD with screws. These mounting clips allow the peripheral device to be mounted in the chassis without using screws between the chassis and the mounting clips.

Snap-in FDD rails are commercially available which utilize grounding wire springs to secure the rails to the FDD. The FDD-rail assembly may then be slid into the chassis and snapped into place. However, these rails are relatively expensive, require the width of the bay to be increased and tend to fall off of the FDD as they are handled during assembly into the chassis.

Accordingly, a need has arisen for an apparatus and method that reduces the time and cost of mounting a peripheral device into the chassis of a computer system.

SUMMARY

One embodiment, accordingly, provides an apparatus that allows a peripheral device to be economically and securely installed without tools and without separate fasteners. To this end, one embodiment provides a mounting bracket including a plurality of walls. The plurality of walls includes a main wall and spaced apart walls attached to the main wall. A protruding member extends from one of the walls for engaging a peripheral device.

Several advantages are achieved by an apparatus according to embodiments presented herein. Screws for securing the peripheral device to the chassis are eliminated. The screwless apparatus may be attached to the peripheral device prior to the time of assembly onto the chassis. The apparatus may also include features for aligning the peripheral device to the chassis during installation. The configuration of the present apparatus contributes to the width of the bay in the chassis being reduced.

BRIEF DESCRIPTION OF THE DRAWING FIGURES

DETAILED DESCRIPTION

Figure 1:
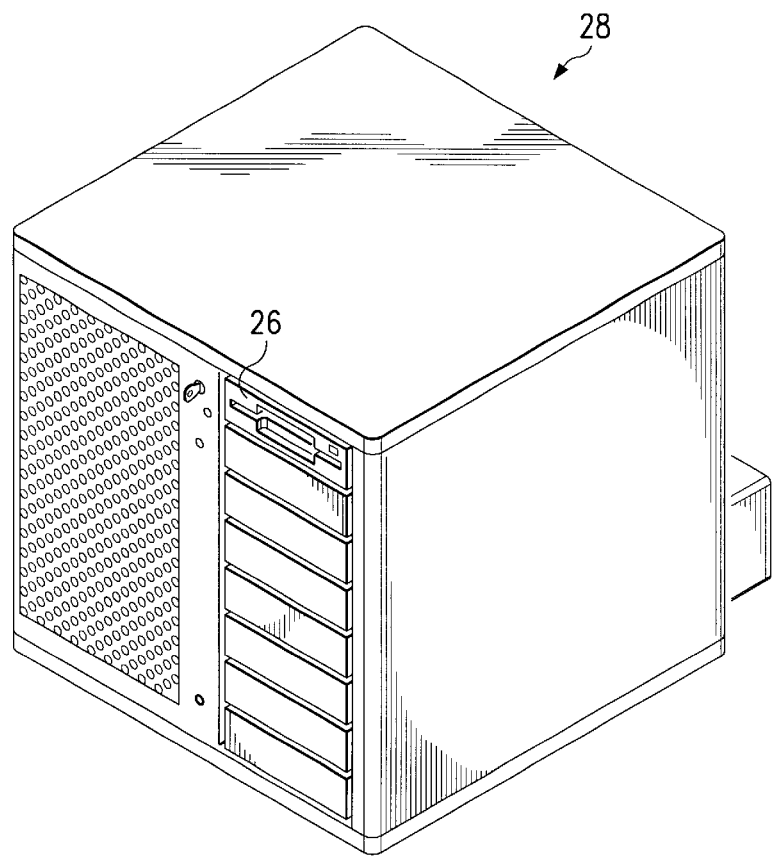
FIG. 1 is a perspective view illustrating an embodiment of a computer system chassis.
Figure 2:
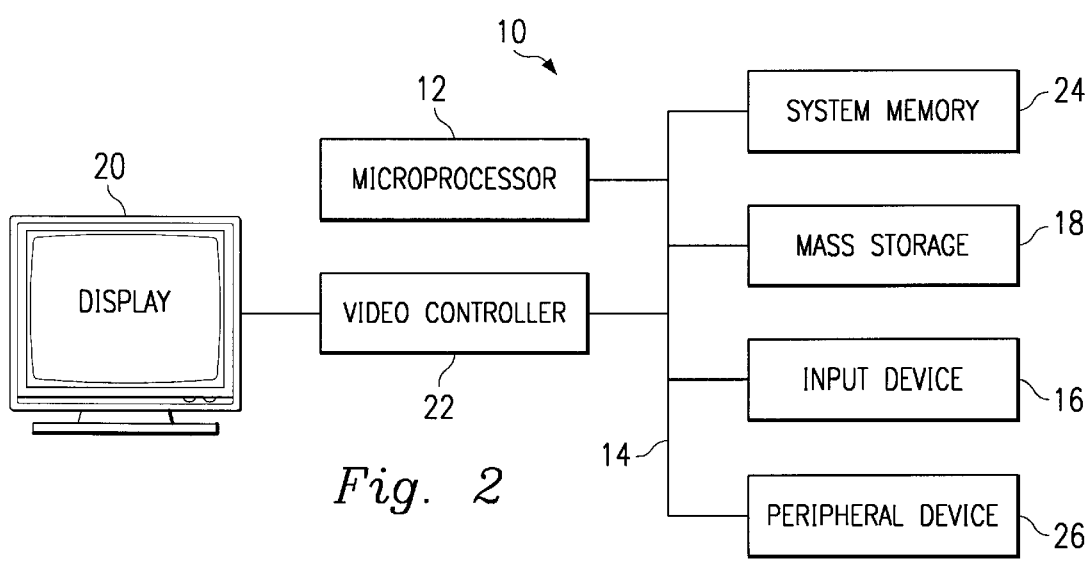
FIG. 2 is a block diagram illustrating an embodiment of a computer system.

FIGS. 1 and 2 illustrate an embodiment of a computer chassis 28 and a computer system, indicated generally at 10. The computer system 10 includes at least one microprocessor 12. The microprocessor 12 is connected to a bus 14. The bus 14 serves as a connection between the microprocessor 12 and other components of the computer system 10. An input device 16 is coupled to the microprocessor 12 to provide input to the microprocessor 12. Examples of input devices include keyboards, touchscreens, and pointing devices such as a mouse, a trackball and a trackpad. The computer system 10 further includes a display 20 which is coupled to the microprocessor 12 typically by a video controller 22. Programs and data are stored on a mass storage device 18 which is coupled to the microprocessor 12. Mass storage devices include components such as hard disks, optical disks, magneto-optical drives, floppy drives, and the like. The system memory 24 provides the microprocessor 12 with fast storage to facilitate execution of computer programs by the microprocessor 12. A peripheral device 26 for providing the computer system 10 with additional functionality may be connected to the microprocessor 12. Examples of peripheral devices include floppy disk drives, compact disc players, digital video disc players, memory card readers, and other types of ancillary devices. It should be understood that other busses and intermediate circuits can be employed between the components described above and microprocessor 12 to facilitate interconnection between the components and the microprocessor.

Figure 3:
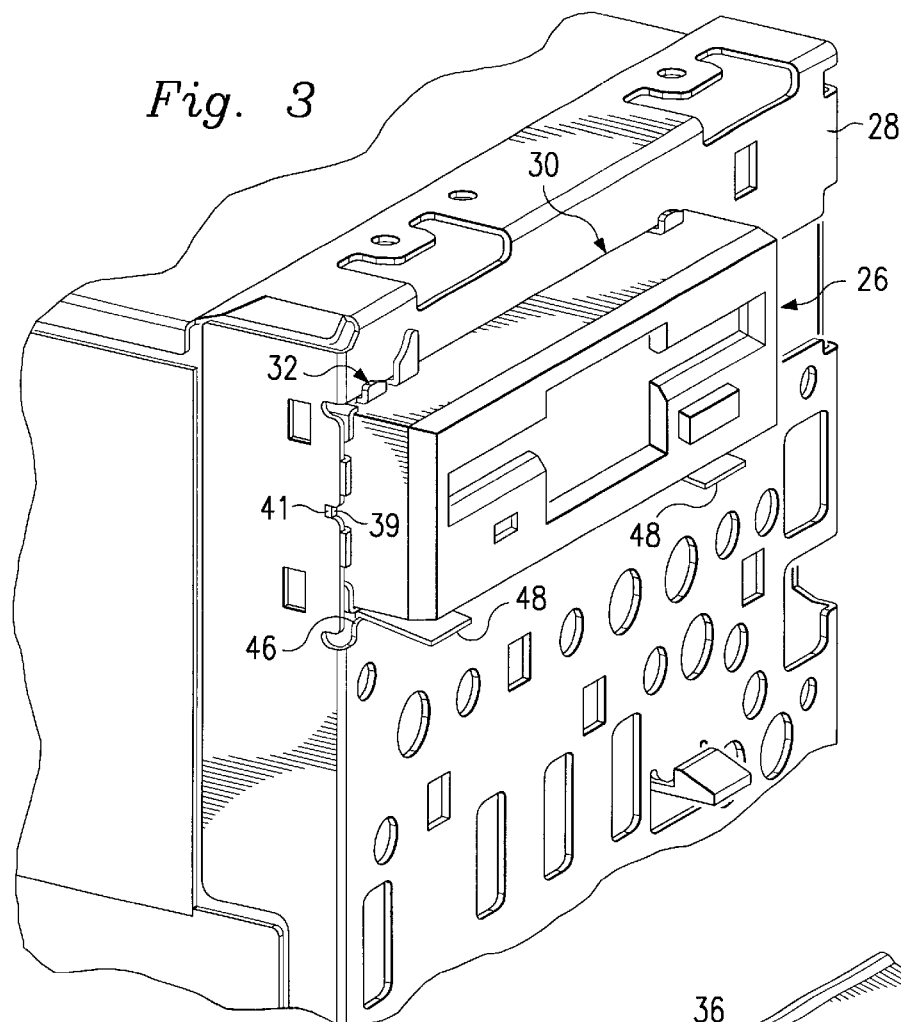
FIG. 3 is a perspective view illustrating an embodiment of a chassis having a peripheral device mounted therein.

FIG. 3 illustrates an embodiment of a peripheral device 26 mounted in the chassis 28 of the computer system 10. The chassis 28 includes a bay 30 for receiving the peripheral device 26. The peripheral device 26 is mounted to the chassis 28 using a mounting bracket 32 illustrated in FIG. 4.

Each mounting bracket 32 includes a main wall 34, two spaced apart walls 36, and a protruding member 38 attached to one of the spaced apart walls 36. The protruding member 38 may also be attached to the main wall 34. Typically, the spaced apart walls 36 are oriented generally parallel to each other or angled slightly inwards toward each other.

The mounting bracket 32 may include a centering flange 37. The centering flange 37 may be attached to the main wall 34 or to any other suitable portion of the mounting bracket 32. The centering flange 37 is disposed in angular relation to the main wall 34. The centering flange 37 is deflected by the chassis 28 when the peripheral device 26 is inserted into the bay 30. The deflection of the centering flange 37 results in a force being provided from the centering flange 37 against the chassis 28. The force acts to minimize movement of peripheral device 26 within the chassis 28.

The mounting bracket 32 may also include an alignment tab 39. The alignment tab 39 may be connected to the centering flange 37. As shown in FIG. 3, when the peripheral device 26 is inserted into the chassis 28, the alignment tab 39 is located within a notch 41 in the chassis 28.

In general, an alignment tab is especially beneficial when the computer system has a system bezel with an integral peripheral bezel portion. In these instances, the peripheral device does not have an attached bezel. The peripheral bezel portion has an access passage for the adjacent peripheral device. Accordingly, alignment of the peripheral device to the system bezel is critical for providing reliable access to the peripheral device.

As illustrated in FIGS. 3–6, the peripheral device 26 includes a plurality of threaded holes 42 formed therein. The mounting bracket 32 is formed such that the protruding member 38 is received in one of the threaded holes 42. In some embodiments of the present mounting bracket 32, it will be desirable to angle the spaced apart walls 36 slightly toward each other such that they engage the peripheral device 26, securing the protruding member 38 in the threaded holes 42.

The positions and size of the threaded holes 42 are typically standardized to correspond to clearance holes in the chassis 28 of the computer system 10. When employing conventional mounting techniques, screws are fastened through clearance holes in the chassis 28 into the threaded holes 42 in the peripheral device 26.

Figure 4:
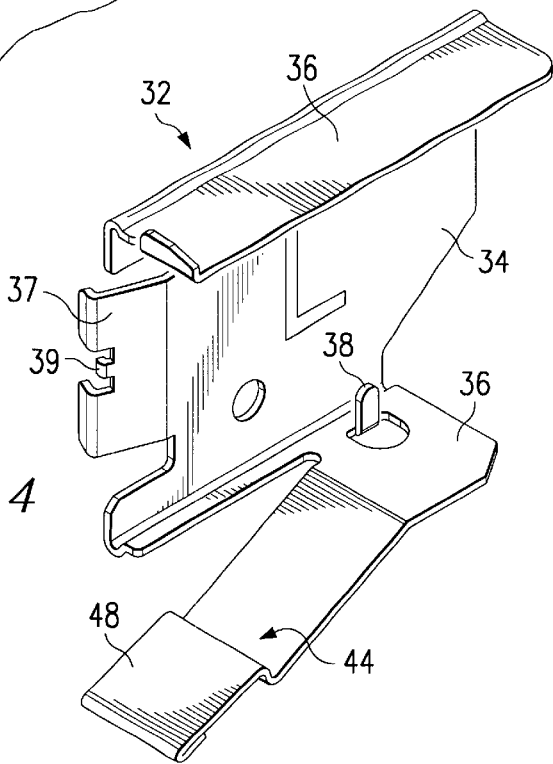
FIG. 4 is a perspective view illustrating an embodiment of a mounting bracket for a peripheral device.
Figure 5:
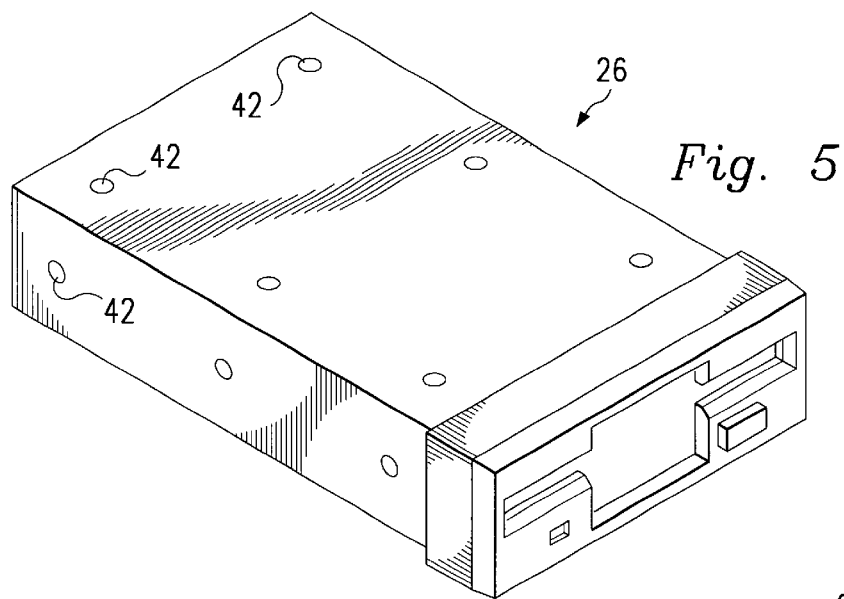
FIG. 5 is a perspective view illustrating an embodiment of a peripheral device having a modular bezel.

The mounting bracket 32 may further include a retaining member 44 FIGS. 3 and 4. The retaining member 44 is attached to one of the spaced apart walls 36 and engages an adjacent edge 46 of the chassis 28 of the computer system 10 to releasably secure the mounting bracket 32 relative to the chassis 28. Similarly, the retaining member 44 may be attached to the main wall 34. A release portion 48 of the retaining member 44 may be depressed to release the retaining member 44 from the adjacent edge 46 of the chassis 28, permitting the peripheral device 26 to be removed from the chassis 28.

Figure 6:
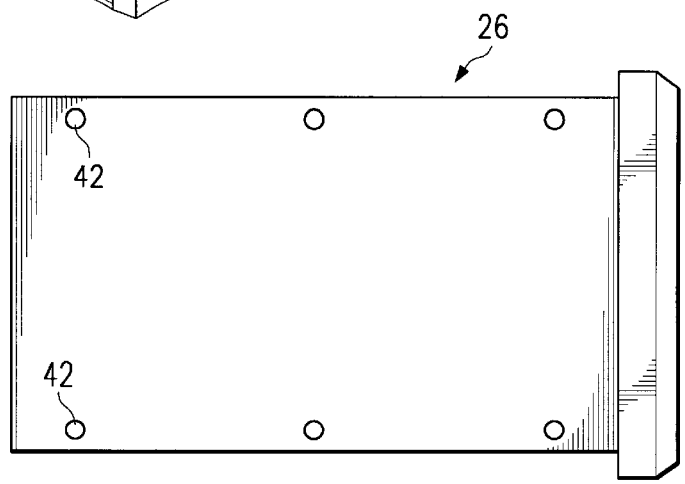
FIG. 6 is a bottom view of the peripheral device illustrated in FIG. 5.
Figure 7:
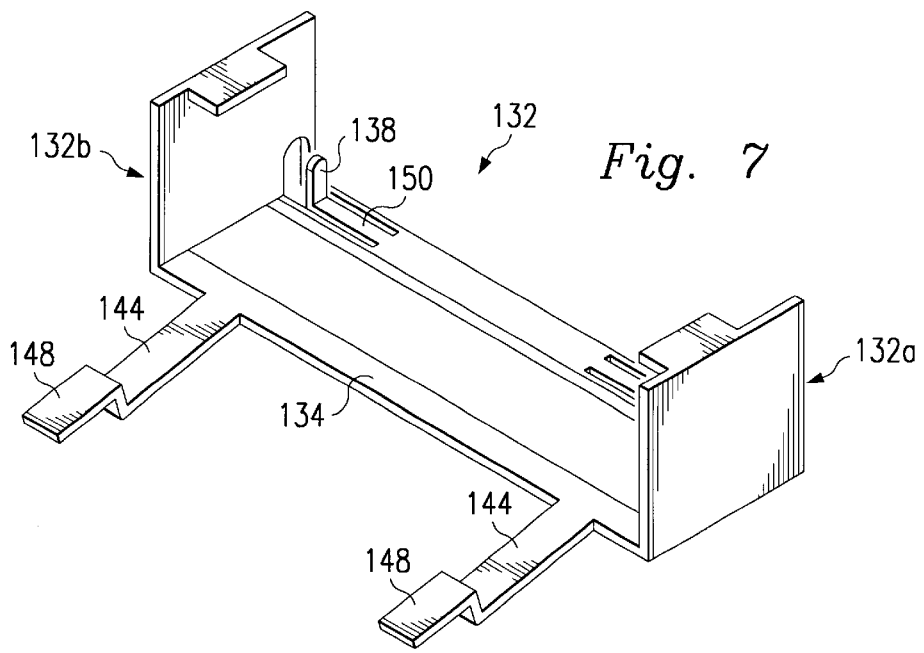
FIG. 7 is a perspective view illustrating an alternate embodiment of a mounting bracket for a peripheral device.

Now referring to FIGS. 6 and 7, an alternate embodiment of a mounting bracket 132 is shown. The mounting bracket 132 is constructed to include a main wall 134 and spaced apart walls 132a, 132b for capturing opposing sides of the peripheral device 26. The mounting bracket 132 includes at least one protruding member 138. The protruding member 138 may be resiliently mounted such as by a resilient arm 150. The resiliently mounted protruding members 138 facilitate simplified attachment of the mounting bracket 132 to a peripheral device. The mounting bracket 132 may also include a retaining member or members 144, each having a release portion 148. The mounting bracket 132 may be mounted over an end of the peripheral device 26 and slid into position. The protruding members 138 are deflected away from the peripheral device 26 until they align with adjacent threaded mounting holes 42 and engage those holes.

The mounting brackets described herein will typically be made of metal or plastic. Progressive die stamping is one technique for forming the mounting brackets from metal. Injection molding is one technique for forming the mounting brackets from plastic.

In operation, the embodiments disclosed herein provide an apparatus that attaches to the peripheral device without screws or other types of discrete fasteners. The mounting brackets include one or more protruding members that engage holes in the peripheral device. The spaced apart walls of the mounting bracket are configured to capture opposing sides of the peripheral device and, together with the protruding member, hold the mounting bracket in its attached position. The peripheral device is installed into the bay of a chassis. The retaining member engages the chassis to secure the peripheral device in place. One or more centering flanges may be provided to engage the chassis and provide a force to minimize movement of the peripheral device within the chassis. An alignment tab may be provided to engage a notch in the chassis to precisely and consistently locate the peripheral device relative to the chassis.

As a result, one embodiment provides a mounting bracket including a plurality of walls. The plurality of walls includes a main wall and spaced apart walls attached to the main wall. A protruding member extends from one of the walls for being received by a hole in a peripheral device.

Another embodiment provides a peripheral device mounting system including a peripheral device having a pattern of threaded holes formed therein, a chassis configured to receive the peripheral device and a mounting bracket. The mounting bracket includes a main wall, two spaced part walls, a protruding member attached to one of the spaced apart walls for being received by one of the holes in the peripheral device, and means for engaging an adjacent edge of a computer system chassis to secure the peripheral device relative to the chassis. The means for engaging is attached to one of the walls.

Yet another embodiment provides a computer system including a chassis; a microprocessor mounted in the chassis; an input coupled to provide input to the microprocessor; a mass storage coupled to the microprocessor; a display coupled to the microprocessor by a video controller; a system memory coupled to provide storage to facilitate execution of computer programs by the microprocessor; a peripheral device having a plurality of holes formed therein; and a mounting bracket for securing the peripheral device in the chassis. The mounting bracket has a plurality of walls including a main wall and spaced apart walls and has a protruding member attached to one of the walls for being received by one of the holes in the peripheral device.

A yet further embodiment provides a method of making an apparatus for mounting a peripheral device in the chassis of a computer system. The method includes the steps of forming a plurality of walls including a main wall and spaced apart walls attached to the main wall; forming a protruding member attached to one of the walls for being received by a hole in a peripheral device; and forming a retaining member attached to one of the walls for engaging an adjacent edge of a computer system chassis to releasably secure the peripheral device relative to the chassis.

As it can be seen, the illustrative embodiments presented herein provide several advantages. Screws for securing the floppy disk drive to the chassis of the computer system are eliminated. The apparatus may be attached to the floppy disk drive prior to the time of assembly into the chassis. The apparatus may also include features for aligning the floppy disk drive unit to the chassis during installation. The apparatus may serve to ground the FDD to the chassis, eliminating the need for a separate ground circuit. A narrower chassis and drive bay may be provided due to the clips of the present disclosure being of a lower profile than conventional plastic rail systems.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A peripheral device mounting system, comprising:

a chassis;

a peripheral device mounted in the chassis and having a pair of opposed surfaces and a pair of opposed edges, the peripheral device having a face exposed adjacent the chassis and having at least one mounting hole formed in the opposed surfaces;

a mounting bracket mounted on the peripheral device, the mounting bracket including a plurality of walls engaging the peripheral device at the edges and surfaces;

a cantilevered resilient retaining member extending from one of the walls;

a resilient release device being a flexible terminal end of the retaining member extending from the chassis; and a protruding member extending from the mounting bracket and engaging the hole.

2. The peripheral device mounting system of claim 1 wherein the resilient retaining member is a cantilevered arm.

3. The peripheral device mounting system of claim 1 wherein the resilient retaining member is adjacent the protruding member.

4. The peripheral device mounting system of claim 1 further comprising an alignment member attached to one of the plurality of walls.

5. The peripheral device mounting system of claim 1 wherein the protruding member is resiliently attached to one of the plurality of walls.

6. The peripheral device mounting system of claim 1 further comprising a centering flange attached to one of the plurality of walls.

7. The peripheral device mounting system of claim 6 further comprising an alignment member attached to the centering flange.

8. A computer system, comprising:

a chassis;

a microprocessor mounted in the chassis;

an input coupled to provide input to the microprocessor;

a video controller coupled to the microprocessor;

a system memory coupled to provide storage to facilitate execution of computer programs by the microprocessor;

a peripheral device mounted in the chassis and having a pair of opposed surfaces and a pair of opposed edges, the peripheral device having a face exposed adjacent the chassis and having at least one mounting hole formed in the opposed surfaces;

a mounting bracket mounted on the peripheral device, the mounting bracket including a plurality of walls engaging the peripheral device at the edges and surfaces;

a cantilevered resilient retaining member extending from one of the walls;

a resilient release device being a flexible terminal end of the retaining member extending from the chassis; and a protruding member extending from the mounting bracket and engaging the hole.

9. The computer system of claim 8 further comprising a centering flange attached to one of the plurality of walls and an alignment member extending from the centering flange, the alignment member engaging a notch formed in the chassis.

10. The computer system of claim 8 wherein the protruding member is resiliently attached to one of the plurality of walls.

11. The computer system of claim 8 wherein the protruding member is adjacent the resilient retaining member.

* * * * *